US011235466B2

(12) United States Patent
Gupta et al.

(10) Patent No.: US 11,235,466 B2
(45) Date of Patent: Feb. 1, 2022

(54) SETUP PLANNING AND PARAMETER SELECTION FOR ROBOTIC FINISHING

(71) Applicant: UNIVERSITY OF SOUTHERN CALIFORNIA, Los Angeles, CA (US)

(72) Inventors: Satyandra Gupta, Los Angeles, CA (US); Ariyan Kabir, Los Angeles, CA (US); Brual Shah, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 328 days.

(21) Appl. No.: 16/391,676

(22) Filed: Apr. 23, 2019

(65) Prior Publication Data
US 2019/0321978 A1 Oct. 24, 2019

Related U.S. Application Data

(60) Provisional application No. 62/661,441, filed on Apr. 23, 2018.

(51) Int. Cl.
*B25J 9/16* (2006.01)
(52) U.S. Cl.
CPC ............ *B25J 9/1666* (2013.01); *B25J 9/163* (2013.01); *B25J 9/1664* (2013.01); *B25J 9/1669* (2013.01); *B25J 9/1692* (2013.01)
(58) Field of Classification Search
CPC combination set(s) only.
See application file for complete search history.

(56) References Cited

U.S. PATENT DOCUMENTS

| | | | | |
|---|---|---|---|---|
| 4,774,445 A | * | 9/1988 | Penkar | G05B 19/416 318/567 |
| 5,814,959 A | * | 9/1998 | Nonaka | B25J 9/1633 318/568.1 |
| 8,315,789 B2 | * | 11/2012 | Dunbabin | E02F 9/2045 701/301 |
| 2008/0081540 A1 | * | 4/2008 | Sato | B24B 37/345 451/28 |

(Continued)

OTHER PUBLICATIONS

Jan Rosell, Graphical Task-Level Robot Programming for Polishing and Grinding, 2002, Elsevier IFAC Publications. (Year: 2002).*

*Primary Examiner* — Jeff A Burke
*Assistant Examiner* — Arslan Azhar
(74) *Attorney, Agent, or Firm* — Snell & Wilmer LLP (57) ABSTRACT

Methods, systems, and platforms for automatic setup planning for a robot. The method includes sampling multiple poses in multiple dimensions within a robotic workspace. The method includes generating one or more candidate configurations based on the multiple poses. The method includes determining a score for each candidate configuration of the one or more candidate configurations. The score represents area coverage of a region of interest and at least one of an amount of setup time of the candidate configuration or an amount of energy used. The method includes determining a set of candidate configurations that has an overall area coverage that covers the region of interest based on the score for each candidate configuration. The method includes controlling a position and an orientation of the object based on the set of candidate configurations.

20 Claims, 6 Drawing Sheets

(56) References Cited

U.S. PATENT DOCUMENTS

| | | | |
|---|---|---|---|
| 2014/0143991 A1* | 5/2014 | Windprechtinger | B25J 9/0096 |
| | | | 29/23.51 |
| 2016/0039090 A1* | 2/2016 | Oyamada | B25J 9/163 |
| | | | 700/253 |
| 2017/0043477 A1* | 2/2017 | Kitayama | B25J 9/0084 |
| 2018/0161979 A1* | 6/2018 | Okamoto | B25J 3/00 |
| 2019/0275675 A1* | 9/2019 | Seno | G05B 19/02 |
| 2019/0299409 A1* | 10/2019 | Hazan | B25J 9/1692 |
| 2020/0198130 A1* | 6/2020 | Goldberg | B25J 9/1697 |

* cited by examiner

SETUP PLANNING AND PARAMETER SELECTION FOR ROBOTIC FINISHING

CROSS-REFERENCE TO RELATED APPLICATIONS

This application claims priority to and the benefit of U.S. Provisional Patent Application No. 62/661,441 titled "SETUP PLANNING, TRAJECTORY PLANNING AND PARAMETER SELECTION FOR ROBOTIC FINISHING," filed on Apr. 23, 2018, and the entirety of which is hereby incorporated by reference herein.

STATEMENT REGARDING GOVERNMENT RIGHTS

This invention was made with Government support under Contract No. 1634431 awarded by the National Science Foundation (NSF). The Government has certain rights in this invention.

BACKGROUND

Field

This specification relates to a system, method or apparatus for automated setup planning and parameter selection for robotic finishing.

Description of the Related Art

Many applications such as manufacturing, service, and construction involve finishing tasks including polishing, sanding, deburring, and cleaning. These tasks are tedious in nature and the use of robots on finishing tasks would increase human productivity. Robot manipulators have limited workspace, and so, the tools mounted on the robot often cannot reach the entire region requiring the finishing operation without the repositioning of the part with respect to the robot. The repositioning of the part with respect to the robot is called setup, and a large complex part may require multiple setups. These setups require significant time, and thus, a plan to minimize the number of setup changes is important in using robots on finishing tasks on complex parts.

Moreover, when the part is positioned, the robot must manipulate a tool, which is in physical contact with the part. The robot manipulates the tool following a trajectory by moving one or more joint configurations. When moving the one or more joint configurations, the robot must avoid collisions and any unwanted contact with the part or other part of the robot. Moreover, the robot must control or manipulate the use of the tool to finish the part. The robot uses a set of motion parameters and tool interaction parameters to control the manipulation of the tool to finish the part. These parameters must be controlled precisely and accurately to finish the part.

Accordingly, there is a need to minimize the number of setup changes and more accurately control or manipulate the tool to finish a part.

SUMMARY

In general, one aspect of the subject matter described in this specification may be embodied in a method for automated setup planning for a robot. The method includes sampling, by a processor, multiple poses in multiple dimensions within a robotic workspace to generate one or more candidate configurations. The method includes generating, by the processor, the one or more candidate configurations based on the multiple poses. The method includes determining, by the processor, a score for each candidate configuration of the one or more candidate configurations. The score represents area coverage of a region of interest and at least one of an amount of setup time of the candidate configuration or an amount of energy used. The method includes determining, by the processor, a set of candidate configurations that has an overall area coverage that covers the region of interest based on the score for each candidate configuration. The method includes controlling, by the processor and using a motor or actuator connected to an object holder or platform, a position and an orientation of the object based on the set of candidate configurations.

These and other embodiments may optionally include one or more of the following features. The multiple dimensions may include 3 dimensions for a location of the object and 3 dimensions for an orientation of the object. The method may include determining a first pose of the multiple poses having a first location and a first orientation. The method may include calculating an amount of time to setup the first pose based on the first location and the first orientation. The method may include determining a second pose of the multiple poses having a second location and a second orientation. The method may include calculating an amount of time to setup the second pose based on the second location and the second orientation.

The method may include determining a corresponding area coverage on the object for each of the one or more candidate configurations. The method may include determining an amount of time to setup each of the one or more candidate configurations. The method may include determining an amount of time to cover the corresponding area coverage on the object and an amount of time to reach a position and an orientation of the candidate configuration. The method may include determining a score for each candidate configuration of the one or more candidate configurations based on the corresponding area coverage on the object and the amount of time to setup each of the one or more candidate configurations.

The method may include obtaining user input that defines the region of interest and a parameter including at least one of an amount of setup time or an amount of energy that is used in determining the score. The method may include optimizing the set of candidate configurations. Optimizing the set of candidate configurations may include determining an overall set score for different sets of candidate configurations and may include selecting the set of candidate configurations that maximizes the overall set score. The method may include applying inverse kinematics to determine a setup time for a joint angle of the robot for one or more waypoints along a trajectory of a path of the object when a degree of freedom of the robot is less than or equal to 6. The method may include determining the set of candidate configurations that has the overall area coverage that covers the region of interest and minimizes the amount of setup time of the set of candidate configurations further based on the setup time for the robot.

In another aspect, the subject matter may be embodied in a robotic platform. The robotic platform includes at least one of a motor or an actuator configured to move a robot. The robotic platform includes one or more processors and a memory. The memory is configured to store computer-readable instructions that when executed by the one or more processors, cause the one or more processors to perform operations. The operations include sampling multiple poses in multiple dimensions within a robotic workspace to generate multiple candidate configurations including a first candidate configuration and a second candidate configuration. The operations include determining a first score for the first candidate configuration based on a first area coverage of a region of interest and a first amount of setup time. The operations include determining a second score for the second candidate configuration based on a second area coverage of the region of interest and a second amount of setup time. The operations include determining a set of candidate configurations that covers the region of interest and minimizes an amount of setup time for the set of candidate configurations based on the first score and the second score. The operations include controlling the at least one of the motor or the actuator connected to an object holder of the robot to position or orient an object on the object holder based on the set of candidate configurations.

In another aspect, the subject matter may be embodied in a computer-implemented method for automated setup planning and finishing for a robot. The method includes sampling, by a processor, multiple poses within a robotic workspace to generate one or more candidate configurations. The method includes determining, by the processor, a score for each candidate configuration of the one or more candidate configurations. The method includes determining, by the processor, multiple sets of candidate configurations that each have an overall area coverage that covers the region of interest and a set score based on the score for each candidate configuration. The method includes selecting, by the processor, a set of candidate configurations from the multiple sets of candidate configurations that has a set score greater than the set score of the other sets of candidate configurations of the multiple sets of candidate configurations. The method includes obtaining, by the processor, one or more constraints and an objective. The method includes determining, by the processor, multiple robot performance parameters based on the one or more constraints and the objective. The method includes controlling, by the processor and using a motor or actuator connected to an object holder or platform, the robot based on the set of candidate configurations and the multiple robot performance parameters.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, platforms and methods for a robotic finishing system. Particular embodiments of the subject matter described in this disclosure may be implemented to realize one or more of the following advantages. The robotic finishing system automates tedious finishing tasks, such as polishing, sanding, deburring and cleaning. The use of the robotic finishing system increases human productivity. The robotic finishing system performs setup planning to minimize the number or amount of changes in the repositioning of the part relative to the robot, otherwise known as "setup". By minimizing the number of setups, the robotic finishing system increases the efficiency, reduces the amount of time and reduces the amount of complex calculations necessary to satisfy robot workspace and tool collision constraints to finish the part.

Other benefits and advantages include the capability to perform trajectory planning of the robot and account for the execution of the trajectory planning to minimize the different setups. The robotic finishing system performs trajectory planning in real time in dynamic environments mapping the movement of the one or more joint configurations within the workspace to avoid collisions. The robotic finishing system estimates the trajectory planning/execution time and accounts for the trajectory execution time when selecting which setups to use in the set of candidate configurations. This minimizes the amount of overall time to cover the region of interest. Additionally, the robotic finishing system controls or manipulates use of the tool using a set of motion parameters and tool interaction parameters to finish the part. By controlling these various motion parameters and tool interaction parameters, the robotic finishing system more precisely and accurately finishes the part.

Figure 1:
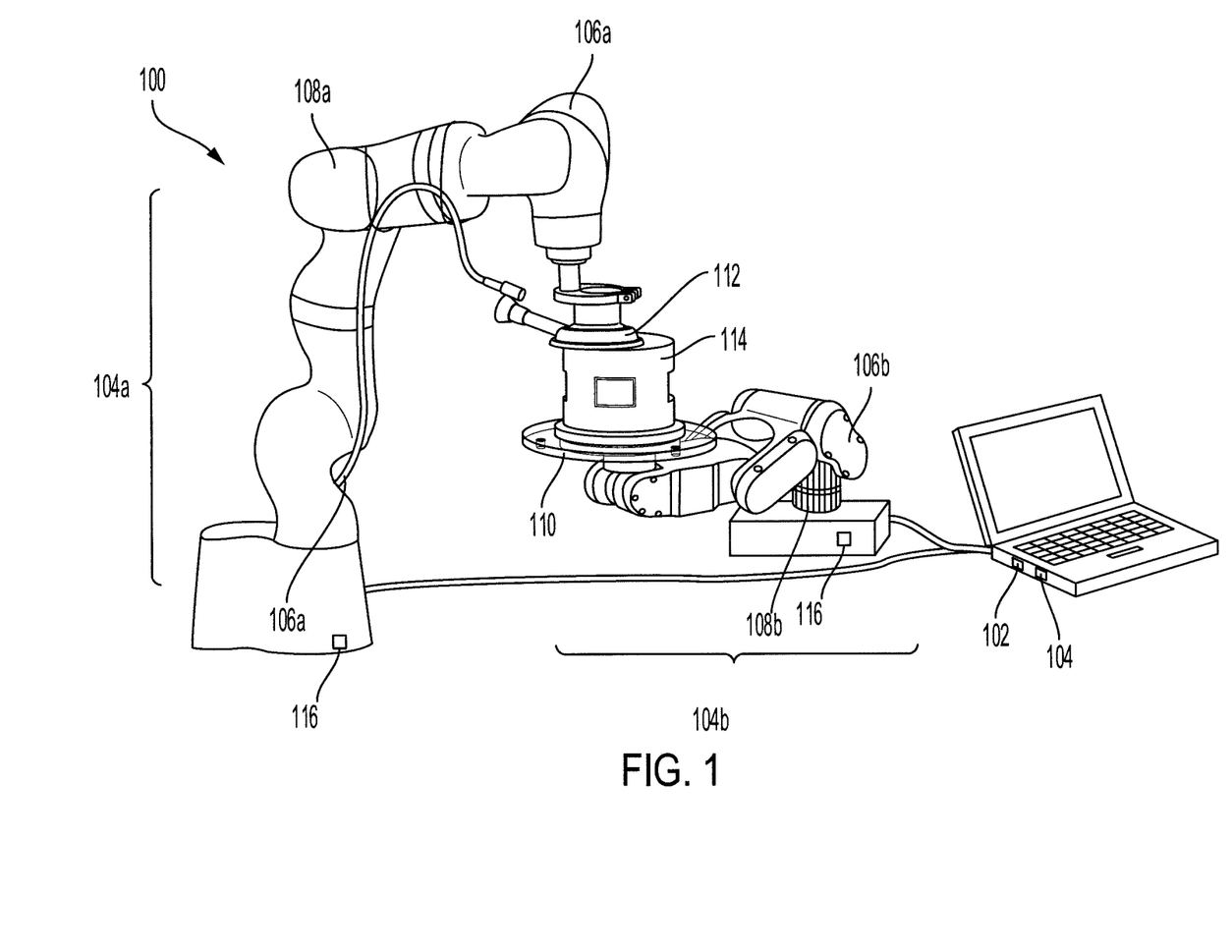
FIG. 1 shows an example robotic finishing system according to an aspect of the invention.

FIG. 1 shows a robotic finishing system ("robotic platform") 100. The robotic platform 100 calculates and determines a set of candidate configurations associated with a set of poses of the robot, which allows the robot cover, access or otherwise finish using a tool on the robot an entire region of interest of an object or part (hereinafter, "part"). The robotic platform 100 minimizes the amount of movement of the robot to a minimum number of poses or setups and ensures coverage of the entire region of interest.

Figure 2:
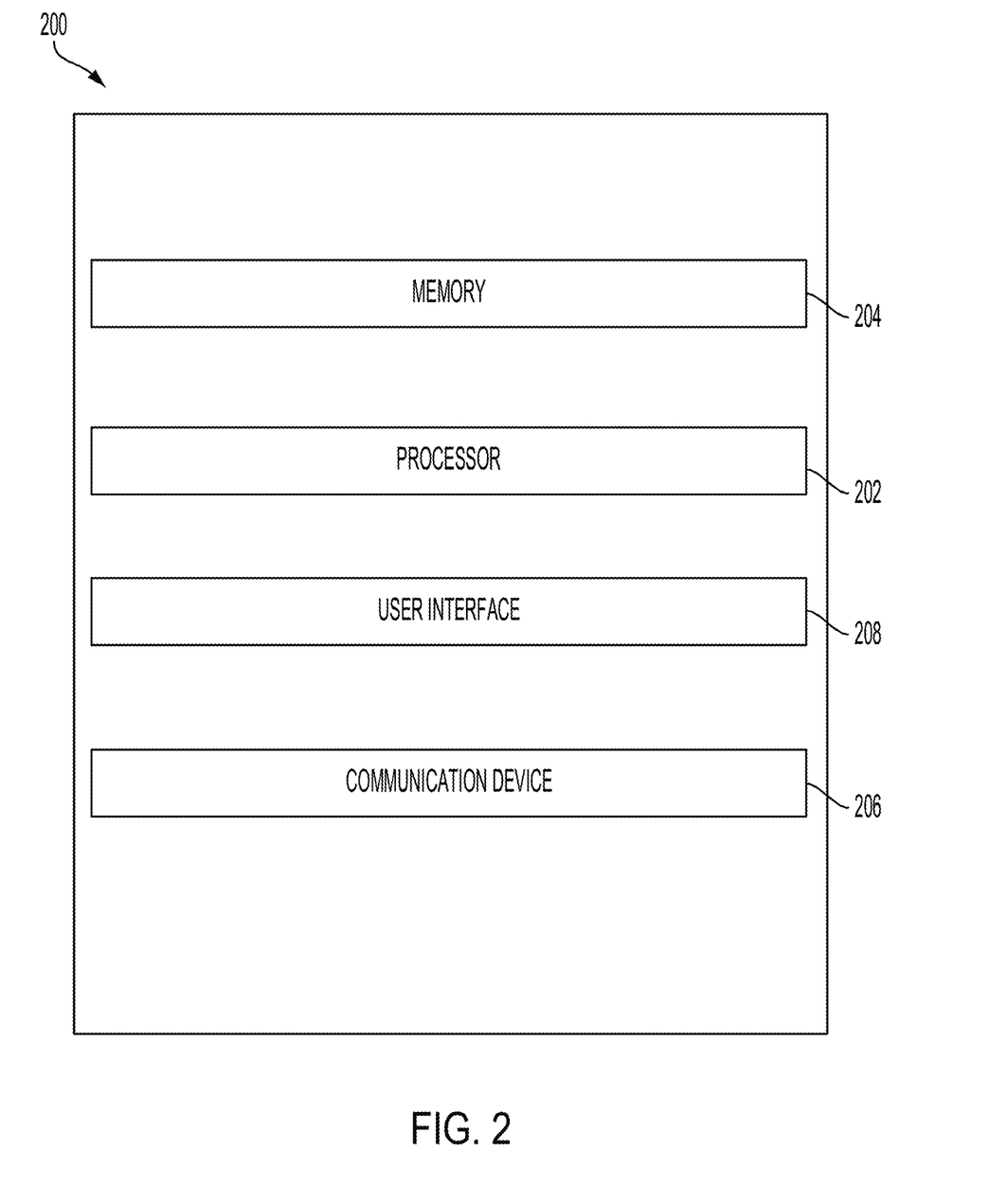
FIG. 2 shows an example block diagram of the computing device of the robotic finishing system of FIG. 1 according to an aspect of the invention.

The robotic platform 100 includes a computing device 102 and one or more robots 104a-b. The computing device 102 has one or more processors 202, a memory 204, a communication device 206 and a user interface 208, as shown in FIG. 2 for example. The one or more robots 104a-b may include one or more motors 106a-b, one or more actuators 108a-b, a robotic object platform 110, and/or a tool 112. The robotic platform 100 may be connected to or coupled with a power source (not shown) that provides power to the one or more motors 106a-b and/or the one or more actuators 108a-b. The robotic platform 100 may have a sensor 116 that measures an amount of power used by the one or more robots 104a-b to manipulate the part 114.

The one or more processors 202 may be implemented as a single processor or as multiple processors. The processor 202 may be electrically coupled to some or all of the components of the robotic platform 100. The processor 202 may be coupled the memory 204, the communication device 206 and/or the user interface 208. The one or more processors 202 may be coupled to the components of the one or more robots 104a-b including the one or more motors 106a-b, one or more actuators 108a-b, the robotic object platform 110 and/or the tool 112. The one or more processors 202 implement instructions stored in the memory 204 to identify or determine the poses of the one or more robots 104a-b that provide access to the tool 112 to cover the entire region of interest while minimizing the overall time including setup time and trajectory planning and/or execution time. Moreover, the one or more processors 202 control the various components of the one or more robots 104a-b to position or orient the part on the robotic object platform 110. The one or more processor 202 may position, orient or otherwise move the one or more motors 106a-b and/or the one or more actuators 108a-b to position or orient the part on the robotic object platform 110.

The memory 204 may be coupled to the one or more processors 202. The memory 204 may store instructions to execute on the one or more processors 202 and may include one or more of a RAM or other volatile or non-volatile memory. The memory 204 may be a non-transitory memory or a data storage device, such as a hard disk drive, a solid-state disk drive, a hybrid disk drive, or other appropriate data storage, and may further store machine-readable instructions, which may be loaded and executed by the one or more processors 202. The memory 204 may store the set of candidate configurations that form a setup plan, provides the position and orientation of different poses of the one or more robots 104a-b and the sequence of the different poses of the one or more robots 104a-b, which covers the region of interest, minimizes setup and execution time and energy.

The computing device 102 may have a communication device 206 and/or a user interface 208. The communication device 206 communicates with other components, such as the one or more robots 104a-b. The communication device 206 may have a communication port or channel, which is wireless, such as one or more of a Wi-Fi unit, a Bluetooth® unit, a radio frequency identification (RFID) tag or reader, or a cellular network unit for accessing a cellular network (such as 3G, 4G or 5G), or which is wired, such as Ethernet. The communication device 206 may transmit data and receive data from the one or more robots 104a-b to control the one or more robots 104a-b.

The computing device 102 may have a user interface 208. The robotic platform 100 may display one or more notifications on the user interface 208 and/or may receive user settings or control information to control the one or more robots 104a-b. The user interface 208 may include an input/output device that receives user input from a user interface element, a button, a dial, a microphone, a keyboard, or a touch screen. The user interface 208 may provide an output to an output device, such as a display, a speaker, an audio and/or visual indicator, or a refreshable braille display. For example, the user interface 208 may display the regions of interest of the object covered in one or more poses or associated candidate configurations of the one or more robots 104a-b.

The robotic platform 100 has one or more robots 104a-b. The one or more robots 104a-b may be a single robot or multiple robots, which each independently operate. The one or more robots 104a may have one or more motors 106a-b, one or more actuators 108a-b, a robotic object platform 110 and/or a tool 112. The one or more motors 106a-b and the one or more actuators 108a-b may be controlled via a data signal from the one or more processors 202. The one or more motors 106a-b and the one or more actuators 108a-b may control a joint of a robot and may be used to actuate movements, giving or allowing the robot to access various precise angles. The one or more motors 106a-b may be connected to a robotic object platform 110, which grasps, fastens, clasps or otherwise holds onto a part 114 in a position and/or orientation relative to the tool 112 within a workspace. The robotic object platform 110 may be positioned at an end of one of the robots 104a-b.

On another end of the robot 104a-b or on an end of another robot 104a-b, the robot 104a-b may have a tool 112. The robot 104a-b uses the tool 112 to fabricate, finish, manipulate or otherwise modify, form and/or otherwise interact with the part 114. For example, the tool 112 may be a sander, a polisher, a deburrer, a cleaner, a saw, a planter, a screwdriver, a vise, a claw or other tool that manipulates, modifies or interacts with the part 114. The part 114 may be an object where the fabrication, modification, manipulation or interaction occurs.

Figure 3:
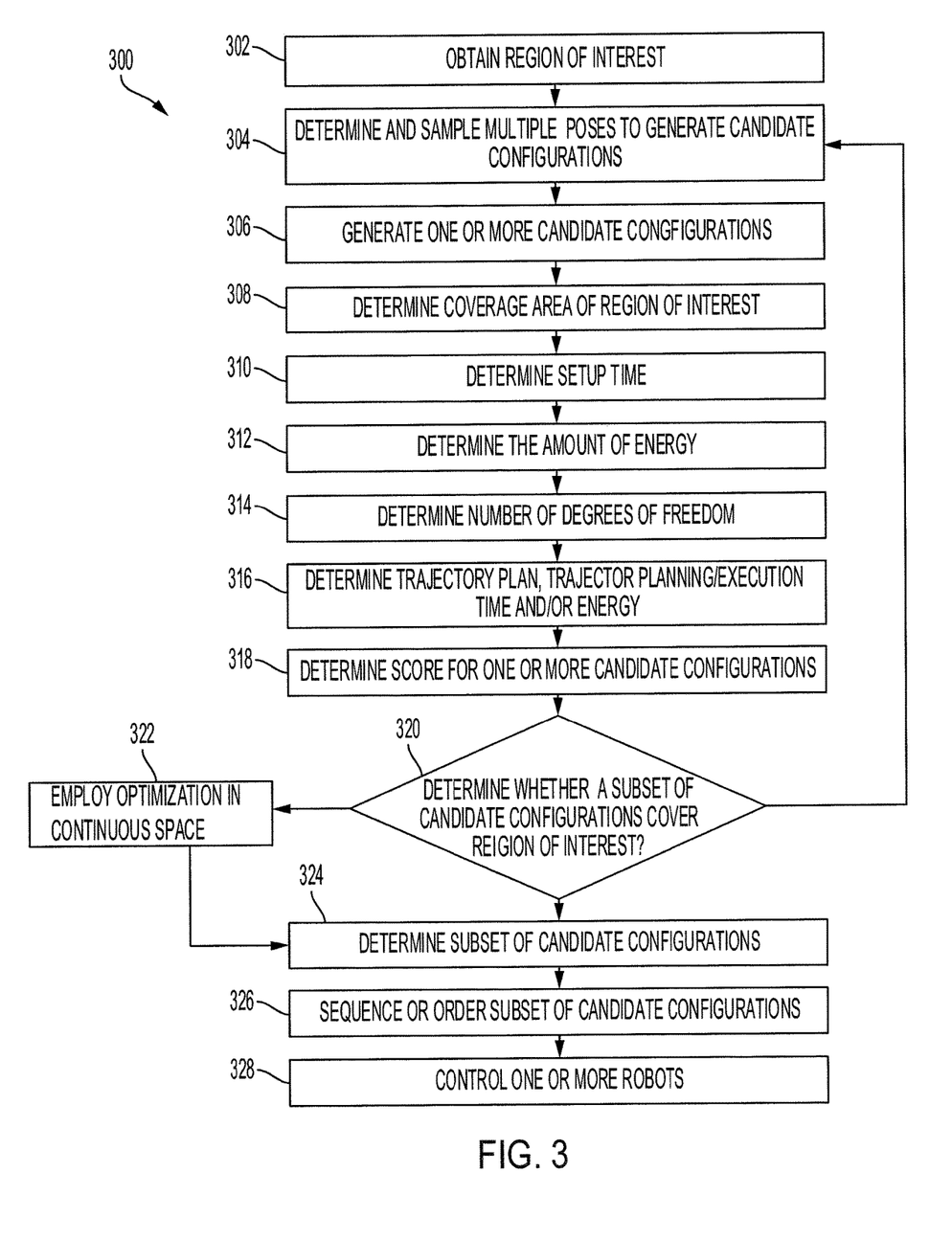
FIG. 3 is a flow diagram of an example process of setting up and planning the positioning of the part by the robotic finishing system of FIG. 1 according to an aspect of the invention.

FIG. 3 is a flow diagram of an example process 300 of setting up and planning the positioning and orientation of the part. One or more computers or one or more data processing apparatuses, for example, the one or more processors 202 of the computing device 102 of the robotic platform 100 of FIG. 1, appropriately programmed, may implement the process 300.

The robotic platform 100 may obtain the region of interest (302). The robotic platform 100 may have stored the region of interest in the memory 204 and obtain the region of interest from the memory 204 to perform the setup planning. In some implementations, the robotic platform 100 may receive the region of interest from user input provided via the user interface 208. For example, a user may provide user input including the region of interest of the part via the user interface 208 for the robotic platform 100. The region of interest is the area or curved surface of the part 114 that is to be finished, manipulated or otherwise interacted with by the robots 104a-b. The region of interested may be represented in six dimensions, such as by a three-dimensional position and a three-dimensional orientation of the part 114, within the workspace.

Once the region of interest is obtained, the robotic platform 100 may determine and sample multiple poses within the robotic workspace to generate one or more candidate configurations (304). A pose is a position and orientation of a robot 104a-b including the end-effector, such as a tool 112. When the robot 104a-b is in a single pose, the robot 104a-b may have access to finish a portion of the region of interest. This partial area of the region of interest may be referred to as a patch. The position and orientation of the robot 104a-b may be represented in both a three-dimensional position and three-dimensional orientation within the workspace.

The robotic platform 100 determines and samples multiple poses within the six different dimensions, e.g., the three-dimensional position and the three-dimensional orientation, and which may be represented by three different parameters for the position and three different parameters for the orientation. The robotic platform 100 initially selects an initial pose having an initial set of coordinates and orientation within the constraints of workspace. The selection of the initial pose may be random or based on a model formed from a prior setup planning of a similar corresponding part and is represented by an initial three-dimensional coordinate and an initial three-dimensional orientation within the workspace. The robotic platform 100 increments one or more of the parameters for the three-dimensional position and/or the three-dimensional orientation to form the next pose having a different set of coordinates and orientation within the workspace. The robotic platform 100 may uniformly increment the one or more parameters within the different dimensions, i.e., position or orientation, of the workspace to form the next pose.

The robotic platform 100 generates one or more candidate configurations based on the sampled multiple poses (306). These candidate configurations represent a three-dimensional position and/or a three-dimensional orientation of the part within the workspace. For each of the one or more candidate configurations, the robotic platform 100 determines a coverage area or patch of the region of the interest that the candidate configuration provides the robotic platform 100 access to finish, manipulate or otherwise interact with the part (308). The robotic platform 100 measures the position reachability and/or the orientation reachability of the coverage area to determine the coverage area or patch that the robotic platform 100 has access or ability to manipulate or interact with the part 114.

Figure 4A:
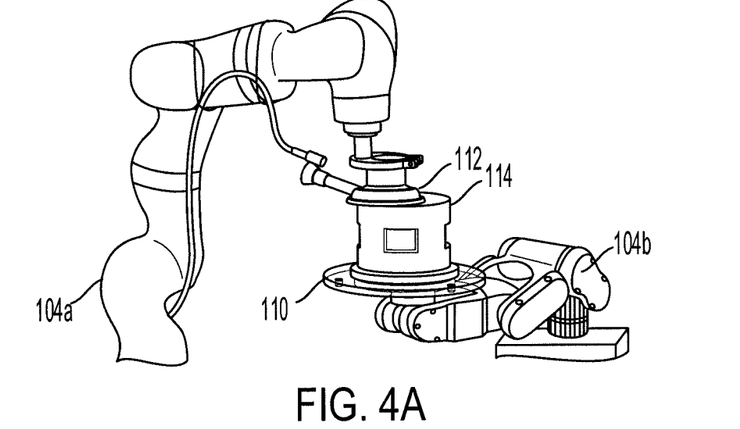
FIG. 4A shows an example part positioned by the robotic finishing system of FIG. 1 in a first position and a first orientation to cover a first coverage area of a region of interest according to an aspect of the invention.
Figure 4B:
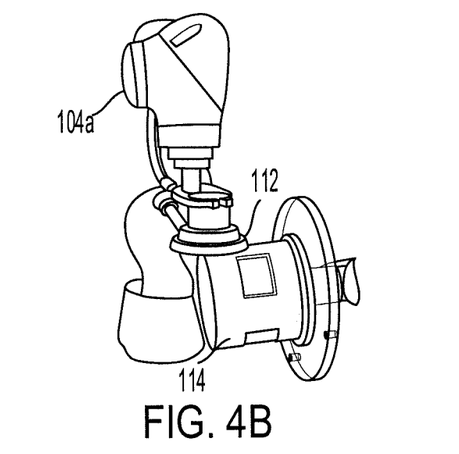
FIG. 4B shows the example part positioned by the robotic finishing system of FIG. 1 in a second position and a second orientation to cover a second coverage of the region of interest according to an aspect of the invention.
Figure 4C:
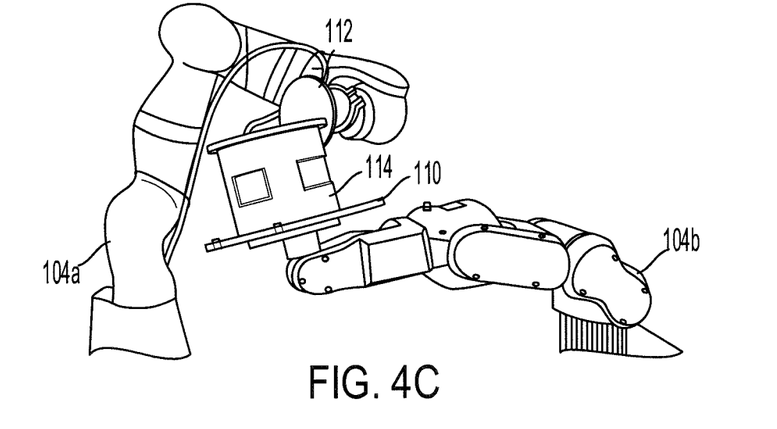
FIG. 4C shows the example part positioned by the robotic finishing system of FIG. 1 in a third position and a third orientation to cover a third coverage area of the region of interest according to an aspect of the invention.
Figure 5A:
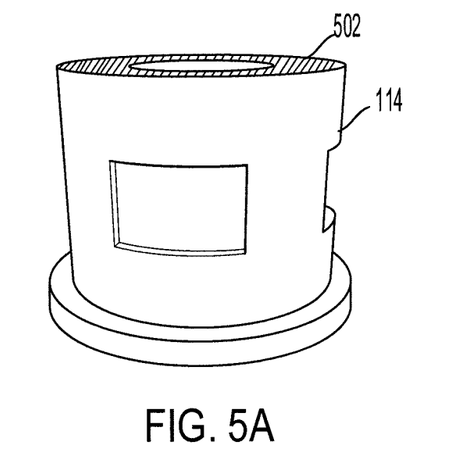
FIG. 5A shows an example coverage area or patch of the region of interest when the robotic finishing system of FIG. 1 is positioned in the first position and the first orientation according to an aspect of the invention.
Figure 5B:
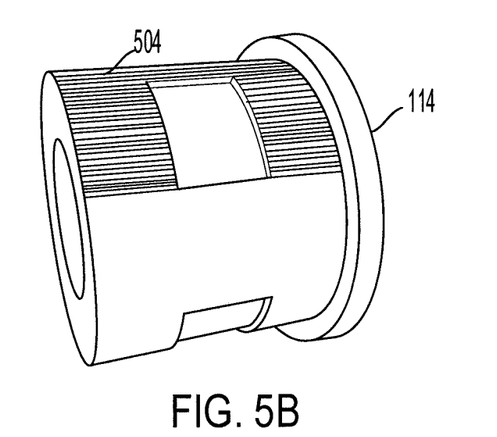
FIG. 5B shows an example coverage area or patch of the region of interest when the robotic finishing system of FIG. 1 is positioned in the second position and the second orientation according to an aspect of the invention.
Figure 5C:
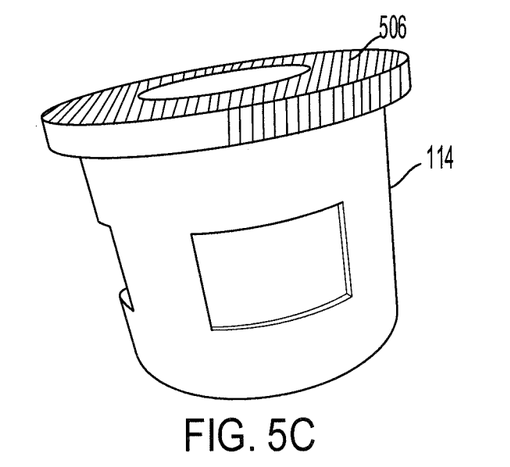
FIG. 5C shows an example coverage area or patch of the region of interest when the robotic finishing system of FIG. 1 is positioned in the third position and the third orientation according to an aspect of the invention.

FIGS. 4A-4C show different candidate configurations of the robots 104a-b to reach and finish different coverage areas of the region of interest of the part. FIGS. 5A-5C show the different coverage areas for each of the candidate configurations of FIGS. 4A-4C. For example, a first candidate configuration has a first position and a first orientation for the part 114, as shown in FIG. 4A. When the part 114 is in the first candidate configuration, the robot 104a-b, and in particular, the tool 112 is able to finish the first coverage area or patch 502 on the part 114, as shown in FIG. 5A.

In another example, a second candidate configuration has a second position and a second orientation for the part 114, as shown in FIG. 4B. When the part 114 is in the second candidate configuration, the robot 104a-b, and in particular, the tool 112 is able to finish the second coverage area or patch 504 on the part 114, as shown in FIG. 5B. In another example, a third candidate configuration has a third position and a third orientation for the part 114, as shown in FIG. 4C. When the part 114 is in the third candidate configuration, the robot 104a-b, and in particular, the tool 112 is able to finish the third coverage area or patch 506 on the part 114, as shown in FIG. 5C.

The robotic platform 100 determines a setup time between each of the different candidate configurations (310). The robotic platform 100 may measure the time in between each of the candidate configurations. For example, the robotic platform 100 measures an amount of time to move the part 114 from an origin or starting point to the first candidate configuration, an amount of time to move the part 114 from the first candidate configuration to the second candidate configuration, and/or an amount of time to move the part 114 from the second candidate configuration to the third candidate configuration. The setup time may include positioning and orienting the part 114 from a previous position and/or orientation. A valid setup may be an ordered sequence of setups that finishes an entire region of interest. In some implementations, the robotic platform 100 determines an amount of energy used to position and/or orient the part 114 into each of the candidate configurations (312). The robotic platform 100 may measure the amount of energy depleted or used from a power source by the motor 106a-b and/or actuator 108a-b to position and/or orient the part 114 from each of the candidate configurations, e.g., from the original position and/or orientation to a first candidate configuration, from the first candidate configuration to the second candidate configuration, and from the second candidate configuration to the third candidate configuration.

The robotic platform 100 determines a number of degrees of freedom of the one or more robots 104a-b (314). The number of degrees of freedom may be pre-configured as a setting stored in the memory 204. The robotic platform 100 may have received user input that indicates the number of degrees of freedom of the one or more robots 104a-b and stores the indication of the number of degrees of freedom in the memory 204.

The robotic platform 100 determines a trajectory plan and trajectory planning/execution time and/or energy (316). For each candidate configuration, the robotic platform 100 may not be able to finish the finishing the entire coverage area or patch of the region of interest using a single continuous path and may need to re-orient the robot 104a-b and execute another path to finish the entire coverage area or patch of the region of interest associated with the candidate configuration. That is, the robotic platform 100 may need to reposition the tool to cover disjointed patches in a setup. The robotic platform 100 may generate a trajectory for each setup that may include multiple passes within each setup. The robotic platform 100 plans and generates a trajectory to trace a curve through the patch using one more trajectory planning methods—Analytical Inverse Kinematics method, Jacobian method, or Optimization method. The robotic platform determines the trajectory plan based on the number of degrees of freedom of the one or more robots 104a-b.

The trajectory planning/execution time and/or energy is the amount time and/or energy required to plan the trajectory or path of the robot 104a-b relative to the part 114 for each of the candidate configurations to traverse one or more corresponding paths to finish the coverage area or patch of the region of interest. The trajectory execution time and/or energy is the amount of time and/or energy required to execute the one or more paths for each of the candidate configurations. For each setup, $s_j$, there is an execution time $t^e(\tau_j)=t^c(\tau_j)+t^r(\tau_j)$, where $t^c(\tau_j)=t_j$ is the finishing time when the tool 112 is in contact with the coverage area of the region of interest while $\tau_j$ and $t^r(\tau_j)$ are the repositioning times when the finishing robot moves between disjoint patches. The total finishing time for a valid setup plan, S, of a sequence of setups that finish an entire region of interest, T(S), is $T(S)=\Sigma_{j=1}^{s}(t^e(\tau_j)+t_j^s)$.

If the number of degrees of freedom is less than or equal to six, the robotic platform 100 uses the Analytical Inverse Kinematics-based to compute the trajectory planning and trajectory planning time and/or energy. The robotic platform 100 defines waypoints on a curve and solves the inverse kinematics for each waypoint to find the corresponding joint angle for the robot 104a-b. If there is more than one joint angle for the candidate configuration, the robotic platform 100 uses a graph-search algorithm to find the time optimal solution, i.e., the sequence of joint angles that can trace the curve in a minimum amount of time.

The robotic platform 100 represents the candidate configuration in a three-dimensional position and a three-dimensional orientation for a waypoint and allows certain tolerance in position and/or orientation for each waypoint. The robotic platform 100 defines the allowable tolerance in the position and/or orientation using a vector. The robotic platform 100 may sample multiple candidate points, which may be used to replace the waypoint as an acceptable replacement point. Then, the robotic platform 100 may analytically determine the joint angle solutions that satisfy robot motion constraints for each of the waypoints and determines the time and energy to move the robot 104a-b as fast as possible from one joint configuration to the next corresponding joint configuration.

When the degree(s) of freedom is greater than six, the robotic platform 100 may determine which method to use between the Jacobian and the Optimization method using a look up table. The robotic platform 100 may represent the workspace as a voxel grid and mark the voxel grid as reachable by position and with a range of orientation. The robotic platform 100 may populate the voxel grid using analytical closed form equations of forward kinematics. Once the workspace is represented as a voxel grid, the robotic platform 100 may fit the trace-curve in the voxel grid. If the trace-curve fits in the voxel grid, the trajectory may be traced by keeping the part 114 static. Thus, the Jacobian trajectory planning may be used for trajectory planning. If the trace-curve does not fit in the voxel grid, the optimization-based trajectory may be used by moving both the tool 112 and part 114 together.

If the number of degrees of freedom is greater than six, the robotic platform 100 may use the Inverse Jacobian-based trajectory planning to compute the trajectory planning and trajectory planning/execution time and/or energy. Since there are infinite possible joint configurations for a candidate configuration with more than six degrees of freedom, the Inverse Kinematics-based trajectory planning may not be feasible. The robotic platform 100 uses the number of joints for the robot 104a-b, $n_R$, the velocity within the workspace, $\dot{X}$, and the velocity within the joint space, $\dot{\Theta}$, for the robot 104a-b where the relation between $\dot{X}$ and $\dot{\Theta}$ is governed by $\dot{X}=J\dot{\Theta}$ where J is the jacobian. The jacobian is a matrix with six rows and $n_R$ columns. Since the inverse of the jacobian may not exist, the robotic platform 100 may form the pseudo inverse of the jacobian, $J^+$, to find the joint space in terms of the velocity of the workspace. Therefore, $\dot{\Theta}=J^+\dot{X}$ with an appropriate relation of $\Theta_t-\Theta_i=J^+(\Theta_i)(X_t-X_i)$, where $X_i$ is the initial pose and known, and $X_t$ is the next or target pose and known, $\Theta_i$ is the initial or current joint configuration, and $\Theta_t$, is the target joint configuration. The robotic platform 100 may sequentially compute the velocity within the joint space, $\Theta_t$, for every waypoint and determine the time and energy to move the robot 104a-b as fast as possible from one joint configuration to the next corresponding joint configuration.

In some implementations, if the number of degrees of freedom is greater than six, the robotic platform 100 may use the Optimization-based trajectory planning to compute the trajectory planning and trajectory planning/execution time and/or energy. The Analytical Inverse Kinematics trajectory planning and the Jacobian trajectory planning may be applicable when the motion of the part is restricted with respect to the global reference frame while executing the motion of the tool 112. The location and the orientation of the part 114 may change with respect to time while executing the motion of the tool 112 to reduce the overall process time of robotic finishing while maintaining contact with the curve and avoid unwanted collisions, and thus, the Optimization-based trajectory planning may be used.

The robotic platform 100 may assume the part 114 may be moved in space using a first robot 104a, a second robot 104b and the tool 112 at time, t, and denote their joint configurations as $\Theta_A(t)$, $\Theta_B(t)$, respectively, and the overall joint configuration $\Theta(t)=[\Theta_A(t), \Theta_B(t)]=F(t, x)$, which is continuous and continuously differentiable with respect to the time. The poses of the first robot 104a and the second robot 104b with respect to the world frame may be represented as homogeneous transformation matrices, $_A{}^wT$ and $_B{}^wT$ respectively. The coordinate frames attached to the robot 104a and robot 104b may be represented as $E_A$ and $E_B$. And so, $_{E_A}{}^wT(t)=_A{}^wT_{E_A}{}^AT(t)$ and $_{E_B}{}^wT(t)=_B{}^wT_{E_B}{}^BT(t)$. Now, $_{E_A}{}^AT(t)=K\Theta_A(t)=K_1\Theta(t)=K_1(F(t,x))$ and $_{E_B}{}^BT(t)=K\Theta_B(t)=K_2\Theta(t)=K_2(F(t,x))$.

The robotic platform 100 may use a constant homogenous transformation matrix $_L{}^{E_A}T$ to govern the pose with respect to $E_A$ where a parametric curve is defined by L(t) that combines the waypoints in a continuous and smooth manner. Therefore, the position and orientation of p(t), where p represents a coordinate frames attached to each point on the curve, L(t), may be represented as $_p{}^wT(t)=_{E_A}{}^wT_L{}^{E_A}T(t)_p{}^LT(t)$. The curve, L(t), may also be parameterized with respect to arc-length parameter, s.

During curve tracing both robots 104a-b may move simultaneously to finish covering the coverage area of the region of interest as fast as possible, i.e., minimizing the total amount of time to trace the curve, without violating joint limit and joint speed constraints. The robotic platform 100 determines a collision score and ensures that the collision score is below a threshold value to ensure that the robots 104a-b avoid all unnecessary collision and contacts. The robotic platform 100 determines the optimized trajectory planning to minimize collision by ensuring that the collision score is below the threshold value while minimizing the total amount of time to trace the curve within the constraints.

The optimization trajectory planning may be represented as follows:

$$\text{Find } x^* \in \mathbb{R}^n \text{ s.t.}$$
$$\forall s \in [0, 1],$$
$$x^* = \underset{x}{\operatorname{argmin}} \, h(x), \, a < x < b$$
$$a, b, x \in \mathbb{R}^n$$
$$G(x, L(s), F(s, x)) < c, \, c \in \mathbb{R}^m$$
$$O(x, L(s), F(s, x)) \leq \epsilon, \, \epsilon \in \mathbb{R}$$
$$F_{min} < F(s) < F_{max}$$
$$F_{min}^d < \dot{F}(s) < F_{max}^d$$

where L(s), the parametric curve, and F(s,x), joint configurations, are continuous and differentiable with respect to s, G(x, L(s), F(s, x)), the tolerance or error within a pose, and O(x, L(s), F(s, x)), the collision score that measures the amount of unnecessary collisions, are highly non-linear. L(s), F(s,x), G(x, L(s), F(s, x)) are known and O(x, L(s), F(s, x)) is unknown but evaluable. The robotic platform 100 may determine the time and energy to move the robot 104a-b as fast as possible from one joint configuration to the next corresponding joint configuration based on the optimized trajectory planning.

The robotic platform 100 determines the score for each of the one or more candidate configurations (318). The robotic platform 100 determines the score based on various parameters. The various parameters include the coverage area or patch of the region of interest that the candidate configuration and/or an overall time or energy used. The overall time or energy used may include the setup time, the amount of energy used to position and/or orient the part, trajectory planning/execution time and/or energy. These parameters measure and represent the reachability of the part 114, e.g., whether the robot 104a-b has access to the region of interest or patches of the region of interest, and the efficiency of finishing the region of interest or patches of the region of interest, e.g., the setup time, the trajectory planning/execution time, and/or the amount of energy to setup and/or traverse the path of the trajectory plan. The combination of the setup time and the trajectory planning/execution time may form an overall setup time for a candidate configuration, and similarly, an amount of energy to traverse the trajectory plan and setup the part 114 may form an overall amount of energy used for a candidate configuration.

The robotic platform 100 may determine whether a subset of the candidate configurations cover the entire region of interest (320). If the candidate configurations cover the entire region of interest, the robotic platform 100 may proceed with setup planning without the need to employ gradient decent to improve coverage area.

If the robotic platform 100 determines that the candidate configurations do not cover the entire region of interest, the robotic platform 100 may employ optimization in the continuous space using gradient decent, for example, to improve or optimize the score of each of the candidate configurations to form additional candidate configurations (322). Each candidate acts as a seed for the gradient decent algorithm which maximizes the areas that are reachable while maintaining the constraints of the robot 104a-b. The different constraints may include a speed, a velocity, a force, an angle of orientation or other limitation of the manipulation of the part 114. Few of the seeds may converge towards a solution that has a high score and leads towards a large amount of reachable area for the covered area or patch of the region of interest. There are few, however, that may be stuck at a local minimas. An active learning-based algorithm runs in the background, monitors the performance of each gradient descent instance. Given the performance of each seed and the area of the region of interest that is covered, the active learning-based algorithm balances eliminating and adding more samples to perform the gradient descent. The active-learning algorithm eliminates the candidate configurations that are stuck in a local minima and that do not yield a productive output, e.g., less coverage area. The active-learning algorithm reduces the coarseness, e.g. by increasing the incrementation of a parameter between samples, of the samples in vicinity of the candidate configurations that are eliminated. The active-learning algorithm maintains the course resolution, e.g., by maintaining or decreasing the incrementation of a parameter, near poses with a better output or more coverage area, e.g., samples that are improving the covered area in each iteration. Thus, the robotic platform 100 balances the exploration vs. exploitation scheme by varying the resolution at which the samples are added to the pool of samples for evaluation, which results in complete coverage of the part with a low number of non-dominated setups.

The robotic platform 100 determines a subset of all the candidate configurations including the original candidate configurations and the additional candidate configurations to cover the entire region of interest of the part 114 (324). The robotic platform 100 may determine the subset based on the set of scores of each candidate configuration represented within the subset to identify the subset of candidate configurations that covers the entire region of interest and also minimizes the overall time and energy to position, orient, move and/or traverse the part 114. The subset may be a single candidate configuration and/or a set of multiple candidate configurations.

The robotic platform 100 may determine a sequence or an order to implement each candidate configuration within the subset of the candidate configurations (326). The robotic platform 100 may optimally arrange the sequence or the order to implement each candidate configuration to minimize the amount of time and/or energy expended to move, position, orient or otherwise manipulate the part 114. For example, the robotic platform 100 may prioritize the order of the candidate configurations based on the coverage area of the region of interest, such as by starting with the candidate configuration that covers the most area of the region of interest, and subsequently proceeding to the next candidate configuration that covers the greatest area among the remaining candidate configurations and ending with the candidate configuration that covers the least area of the region of interest.

The robotic platform 100 may use a branch-n-bound algorithm to select the setups based upon the score, which ensures reachability of the region of interest and minimizes the overall time for all the discrete setups. A finishing rate may be computed for all the setups and the setup with the maximum finishing rate may be selected. This assists in determining the remaining stain area to be covered. Then, the robotic platform 100 may recompute the finishing rate for all setups and select the setup, which has the maximum finishing rate. The robotic platform 100 may repeat the cycle until all the stain area is covered. The total finishing time is the sum of the setup and execution times for all the setups in the solution sequence. The robotic platform 100 employs a branch-n-bound algorithm to identify solutions with an improved finishing time.

The robotic platform 100 may control the one or more robots 104a-b based on the subset of candidate configurations and the sequence (328). The robotic platform 100 may cause the one or more motors 106a-b and/or the one or more actuators 108a-b based on the sequence and the subset of candidate configurations to move the one or more robots 104a-b along with the part 114 to allow the one or more robots 104a-b to finish the region of interest.

The robotic platform 100 may accumulate the sampled numerous poses along with the corresponding scores and use the sampled poses along with the corresponding scores to generate a model (330). The robotic platform 100 may use the model to determine the next pose to sample including a position and orientation of the pose to be sampled. The model satisfies an objective function that maximizes the score, which is based on the reachability coverage area of the region of interest and minimizes the overall time including the setup time and trajectory execution and planning time and/or the overall energy used. This allows the robotic platform 100 to select samples, which are anticipated to maximize the score.

Figure 6:
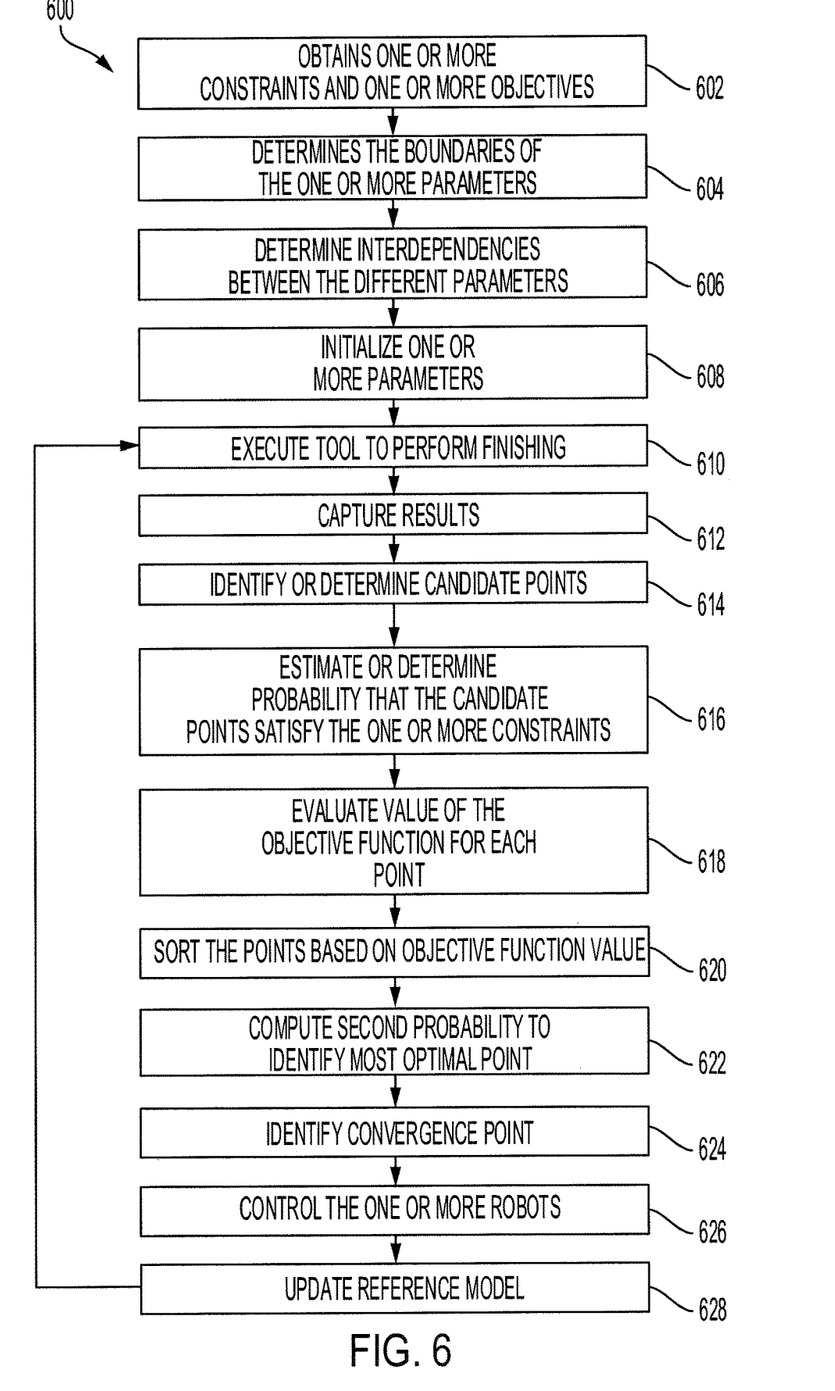
FIG. 6 is a flow diagram of an example process for determining or selecting parameters for robotic finishing using the robotic finishing system of FIG. 1 according to an aspect of the invention.

FIG. 6 is a flow diagram of an example process 600 of determining or selecting parameters for robotic finishing, which optimize the trajectory parameters for robot finishing.

One or more computers or one or more data processing apparatuses, for example, the one or more processors 202 of the computing device 102 of the robotic platform 100 of FIG. 1, appropriately programmed, may implement the process 600.

The robotic platform 100 automatically optimizes different parameters for robotic finishing and learns from the results of the different parameters to identify the optimal parameters. The different parameters may include finishing performance normal force, shear force, tool velocity, rotation speed of tool, curvature of target surface, grit size of finishing tool, 6-axes stiffness of the robot 104a-b, 6-axes damping of the robot 104a-b, oscillation frequency for scrubbing motions, oscillation amplitude for scrubbing motions, and oscillation pattern (spiral, lissjous, circular, etc.).

The robotic platform 100 obtains the one or more constraints and/or one or more objectives (602). The one or more constraints may include maintaining a desired surface roughness, removing a certain amount of dirt or other finishing that is related to the specific application of the one or more robots 104a-b. The one or more constraints may be represented as $g_i(x^*) \geq 0$, i=1, ..., n. The one or more objectives may be represented as $x^* = \mathrm{argmin}(\Sigma_{i=1}^M t(\tau_i^{exp}(x_i)) + t(\tau^{exp}(x))) = \mathrm{argmin}\, f(x)$, where $t(\tau_i^{exp})$ and $t(\tau^{exp})$ are the times for $i^{th}$ exploration and time for complete task execution, respectively, and $f(x)$ represents the objective function.

The robotic platform 100 may receive the one or more constraints and/or the one or more objectives via user input including one or more configurations from the user interface 208. In some implementations, the one or more constraints are pre-programmed and/or pre-configured and stored within the memory 204. The one or more objectives may include the minimization of the overall time to learn and implement the one or more parameters to finish or otherwise manipulate the part 114.

The robotic platform 100 determines the boundaries of the one or more parameters using a physics-based model (604). The physics-based model may define the minimum, maximum and/or range of the one or more parameters, such as a velocity of the tool or an amount of force applied by the tool, to define a parameter space. The physic-based model may be stored in the memory 204 and/or obtained via user input to determine the upper and lower bounds of the one or more parameters. The one or more parameters may include motion parameters, such as direction, speed, etc., and/or tool interaction parameters, such as stiffness, deflection, force, etc. Other parameters may include shear force, rotation speed of tool, curvature of target surface, grit size of the finishing tool, 6-axes stiffness of the robot 104a-b, 6-axes damping of the robot 104a-b, and oscillation pattern.

The robotic platform 100 may determine any interdependency between the different parameters (606). The one or more parameters may be interdependent with another of the one or more parameters. The robotic platform 100 may use the physics-based model or other model or table that identifies the interdependencies or associations among the multiple parameters of the one or more parameters. For example, attaining higher velocities for the tool 112 is not possible at lower stiffness for one or more robots 104a-b. In another example, the applied force and stiffness is governed by $F = k\Delta x$, where F is the applied force, k is the stiffness and $\Delta x$ is displacement.

The robotic platform 100 may initialize one or more parameters (608). The one or more parameters may be initialized based on the physics-based model, which provides an approximate estimation of an initial set of parameters that includes an initial setting of the one or more parameters.

The robotic platform 100 executes the tool 112 to perform finishing of the part 114 using the one or more initialized parameters (610). The robotic platform 100 captures the results of the finishing of the part 114 and updates a reference model with the one or more parameters and the corresponding results of the one or more constraints and/or one or more objectives (612). For example, the robotic platform 100 may determine the amount of time taken to finish the part 114 using the one or more initial parameters and the results of the finishing, e.g., the amount of dirt removed or cleaned and/or the amount of surface roughness of the part 114, associate the one or more parameters with the amount taken to finish the part 114 and the results of the finishing and update a reference model that maps the one or more parameters with the results.

The robotic platform 100 iteratively identifies or determines candidate points within the parameters space (614). The candidate points may be within a proximity of the previously implemented one or more parameters, such as the one or more initial parameters. For example, the robotic platform 100 may increment one or more of the one initial parameters a threshold amount to form one or more candidate points and continue to increment one or more of the previous parameters a threshold amount to form the next candidate point of the one or more candidate points.

Once the robotic platform 100 determines or identifies the one or more candidate points of the one or more parameters, the robotic platform 100 estimates or determines the probability that the one or more candidate points would satisfy the one or more constraints (616). The robotic platform 100 may determine or estimate the probability to satisfy the one or more constraints using the reference model. The robotic platform 100 estimates the mean and standard deviation in the performances for each of the one or more candidate points. From the mean and standard deviation, the robotic platform 100 calculates the probability of meeting the one or more constraints and meeting all of the one or more constraints. Given n constraints, the probability of meeting all the constraints is $P_i^c = P(g_1(x_i) \geq 0) \times \times P(g_2(x_i) \geq 0) \ldots P(g_{n-1}(x_i) \geq 0) \times P(g_n(x_i) \geq 0)$.

The robotic platform 100 evaluates the value of the objective function for each of the one or more candidate and/or initial points (or "points") of the one or more parameters (618). The robotic platform 100 sorts the points based on the values of the objective function for each of the one or more points (620). The robotic platform 100 computes a second probability for each of the one or more points to identify the most optimal point, which satisfies all of the one or more constraints and maximizes the one or more objective functions (622). The second probability represents the probability that a candidate point among the one or more candidate points satisfies the one or more constraints and maximizes the objective function, such as by minimizing the amount of time for the robotic platform 100 to plan and execute the one or more parameters associated with the point. The robotic platform 100 computes the second probability based on first probability to satisfy the one or more constraints and the value of the one or more objectives. The robotic platform 100 computes the second probability, $P_i$, that the candidate point, $x_i$, which is a member of and is the optimal point among the set of candidate points $C_x$. Then, the second probability, $P_i$, follows as:

$$P_1 = P_1^c$$
$$P_2 = P_2^c(1 - P_1)$$
$$P_3 = P_3^c(1 - P_1)(1 - P_2)$$
$$\ldots$$
$$P_i = P_i^c \prod_{j=1}^{i-1}(1 - P_j)$$
$$\ldots$$
$$P_m = P_m^c \prod_{j=1}^{m-1}(1 - P_j)$$

The robotic platform 100 repeats the process of determining and evaluating points associated with one or more parameters until the robotic platform 100 identifies a convergence point that meets all of the one or more points and optimizes the one or more objective functions, e.g., all the constraints are satisfied and the amount of time to plan and execute is minimized (624). Once the convergence point associated with the one or more parameters is identified, the robotic platform 100 use the one or more identified parameters to control the one or more robots 104a-b (626). For example, the robotic platform 100 may adjust the manipulation of the one or more robots 104a-b including the manipulation of the tool 112 based on the one or more parameters that optimize the one or more objective functions and satisfies all of the one or more parameters.

The robotic platform 100 updates the reference model with all the one or more parameters evaluated and the associated results related to the one or more constraints and/or one or more objective functions (628). The robotic platform may use the updated reference model in subsequent finishing of a different part or region of interest of the part 114. The robotic platform 100 may exploit the previously-generated reference models to determine which directions in the search space that will not satisfy the one or more constraints. Therefore, the robotic platform 100 may eliminate the one or more candidate points in the search spaces that does not satisfy the one or more constraints. The lower number of candidate points reduces the computation time and leads to faster convergence to a point that satisfies the one or more constraints and maximizes the objective functions. Moreover, the reference model provides a clear separation between feasible and infeasible regions in the complete parameter space.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for automated setup planning for a robot, comprising:
   sampling, by a processor, a plurality of poses of the robot in a plurality of dimensions within a robotic workspace to generate one or more candidate configurations of an object within the robotic workspace;
   generating, by the processor, the one or more candidate configurations of the object based on the plurality of poses of the robot;
   determining, by the processor, a score for each candidate configuration of the one or more candidate configurations of the object that represents area coverage of a region of interest and at least one of an amount of setup time of the candidate configuration or an amount of energy used;
   determining, by the processor, a set of candidate configurations of the object that has an overall area coverage that covers the region of interest based on the score for each candidate configuration; and
   controlling, by the processor and using a motor or actuator connected to an object holder or platform, a position and an orientation of the object based on the set of candidate configurations of the object.

2. The method of claim 1, wherein the plurality of dimensions includes 6 dimensions.

3. The method of claim 2, wherein sampling the plurality of poses in the plurality of dimensions includes:
   determining a first pose of the plurality of poses having a first location and a first orientation;
   calculating an amount of time to setup the first pose based on the first location and the first orientation;
   determining a second pose of the plurality of poses having a second location and a second orientation; and
   calculating an amount of time to setup the second pose based on the second location and the second orientation.

4. The method of claim 1, further comprising:
   determining a corresponding area coverage on the object for each of the one or more candidate configurations; and
   determining an amount of time to setup each of the one or more candidate configurations.

5. The method of claim 4, wherein determining the amount of time to setup each candidate configuration includes:
   determining an amount of time to cover the corresponding area coverage on the object and an amount of time to reach a position and an orientation of the candidate configuration.

6. The method of claim 4, wherein determining a score for each candidate configuration of the one or more candidate configurations is based on the corresponding area coverage on the object and the amount of time to setup each of the one or more candidate configurations.

7. The method of claim 1, further comprising obtaining user input that defines the region of interest and a parameter including at least one of an amount of setup time or an amount of energy that is used in determining the score.

8. The method of claim 1, wherein determining the set of candidate configurations that has the overall area coverage that covers the region of interest based on the score for each candidate configuration includes:
   optimizing the set of candidate configurations including:
     determining an overall set score for different sets of candidate configurations; and
     selecting the set of candidate configurations that maximizes the overall set score.

9. The method of claim 1, wherein determining the set of candidate configurations that has an overall area coverage that covers the region of interest based on the score for each candidate configuration includes:

applying inverse kinematics to determine a setup time for a joint angle of the robot for one or more waypoints along a trajectory of a path of the object.

10. The method of claim 9, wherein determining the set of candidate configurations that has the overall area coverage that covers the region of interest is further based on the setup time for the robot.

11. A robotic platform, comprising:
 at least one of a motor or an actuator configured to move a robot;
 one or more processors;
 a memory configured to store computer-readable instructions that when executed by the one or more processors, cause the one or more processors to perform operations, the operations comprising:
  sampling a plurality of poses of the robot in a plurality of dimensions within a robotic workspace to generate a plurality of candidate configurations of an object within the robotic workspace including a first candidate configuration and a second candidate configuration;
  determining a first score for the first candidate configuration based on a first area coverage of a region of interest and a first amount of setup time;
  determining a second score for the second candidate configuration based on a second area coverage of the region of interest and a second amount of setup time;
  determining a set of candidate configurations of the object that covers the region of interest and minimizes an amount of setup time for the set of candidate configurations based on the first score and the second score; and
  controlling the at least one of the motor or the actuator connected to an object holder of the robot to position or orient the object on the object holder based on the set of candidate configurations of the object.

12. The robotic platform of claim 11, wherein sampling the plurality of poses of the robot in the plurality of dimensions includes:
 determining a first pose of the plurality of poses having a first location and a first orientation;
 determining a second pose of the plurality of poses having a second location and a second orientation; and
 calculating an amount of time to setup the second pose based on the second location and the second orientation.

13. The robotic platform of claim 11, wherein the operations further comprise:
 determining a corresponding area coverage on the object for each of the plurality of candidate configurations; and
 determining an amount of time to setup each of the plurality of candidate configurations.

14. The robotic platform of claim 11, wherein determining the first score for the first candidate configuration is further based on a first trajectory planning execution time of the first area coverage, wherein determining the second score for the second candidate configuration is further based on a second trajectory planning execution time.

15. The robotic platform of claim 14, wherein the operations further comprise obtaining user input that defines the region of interest.

16. The robotic platform of claim 11, wherein the operations further comprise:
 determining an overall set score for different sets of candidate configurations; and
 selecting the set of candidate configurations that maximizes the overall set score.

17. The robotic platform of claim 11, wherein determining the set of candidate configurations that covers the region of interest based on the first score and the second score includes applying inverse kinematics to determine a setup time for a joint angle of the robot for one or more waypoints along a trajectory of a path of the object.

18. A computer-implemented method for automated setup planning and finishing for a robot, comprising:
 sampling, by a processor, a plurality of poses of the robot within a robotic workspace to generate one or more candidate configurations of an object;
 determining, by the processor, a score for each candidate configuration of the one or more candidate configurations of the object;
 determining, by the processor, a plurality of sets of candidate configurations of the object that each have an overall area coverage that covers a region of interest and a set score based on the score for each candidate configuration;
 selecting, by the processor, a set of candidate configurations from the plurality of sets of candidate configurations that has a set score greater than the set score of the other sets of candidate configurations of the plurality of sets of candidate configurations;
 obtaining, by the processor, one or more constraints and an objective;
 determining, by the processor, a plurality of robot performance parameters based on the one or more constraints and the objective; and
 controlling, by the processor and using a motor or actuator connected to an object holder or platform, the robot based on the set of candidate configurations and the plurality of robot performance parameters.

19. The computer-implemented method of claim 18, wherein the plurality of robot performance parameters include at least one of an amount of normal force, an amount of shear force, a tool velocity, a rotation speed of the tool, a curvature of a target surface, a grit size of the tool, a 6-axes stiffness of the robot, a 6-axes damping of the robot, an oscillation frequency for scrubbing motions, an oscillation amplitude for scrubbing motions, or an oscillation pattern.

20. The computer-implemented method of claim 18, further comprising:
 determining one or more candidate points based on different values of the plurality of robot performance parameters; and
 for each one of the one or more candidate points:
  determining a probability that the candidate point satisfies the one or more constraints,
  evaluating the candidate point using an objective function, and
  determining a second probability that the candidate point is an optimal point based on the probability that the candidate point satisfies the one or more constraints and the evaluation to determine optimal values of the plurality of robot performance parameters.

* * * * *